(12) United States Patent
Koplovich et al.

(10) Patent No.: US 10,789,156 B2
(45) Date of Patent: Sep. 29, 2020

(54) TEST EXECUTION OPTIMIZER FOR TEST AUTOMATION

(71) Applicant: PAYPAL, INC., San Jose, CA (US)

(72) Inventors: Eyal Koplovich, Kfar Haroe (IL); Lucia Lifschitz, Tel Aviv (IL); Amir Emanueli, Givatayim (IL)

(73) Assignee: PAYPAL, INC., San Jose, CA (US)

( * ) Notice: Subject to any disclaimer, the term of this patent is extended or adjusted under 35 U.S.C. 154(b) by 462 days.

(21) Appl. No.: 15/194,285

(22) Filed: Jun. 27, 2016

(65) Prior Publication Data

US 2017/0371772 A1 Dec. 28, 2017

(51) Int. Cl.
*G06F 11/36* (2006.01)
*G06F 8/71* (2018.01)

(52) U.S. Cl.
CPC ...... *G06F 11/3688* (2013.01); *G06F 11/3664* (2013.01); *G06F 11/3672* (2013.01); *G06F 8/71* (2013.01); *G06F 11/368* (2013.01)

(58) Field of Classification Search
CPC .. G06F 11/36; G06F 11/3672; G06F 11/3664; G06F 11/368; G06F 11/3688; G06F 8/71

USPC ......................................................... 717/124
See application file for complete search history.

(56) References Cited

U.S. PATENT DOCUMENTS

| | | | | |
|---|---|---|---|---|
| 7,099,791 B2* | 8/2006 | Fritzsche | ......... | G01R 31/31837 717/162 |
| 2011/0296384 A1* | 12/2011 | Pasternak | ........... | G06F 11/3688 717/124 |
| 2013/0152047 A1* | 6/2013 | Moorthi | ................ | G06F 11/368 717/124 |

\* cited by examiner

*Primary Examiner* — Wei Y Zhen
*Assistant Examiner* — Mohammed N Huda
(74) *Attorney, Agent, or Firm* — Haynes and Boone, LLP

(57) ABSTRACT

The systems and methods that determine tests that may be executed in parallel during regression testing of an analytics application are provided. Multiple tests that test functions of the analytics application are accessed from a test automation suite. For each test, data sources that provide data to the analytics application during the test are identified. The tests are aggregated into temporary groups according to the identified data sources. The test groups are generated from the temporary groups such that each test group comprises tests that are associated with non-overlapping data sources. The regression testing is performed on the application by executing the test groups in parallel.

17 Claims, 7 Drawing Sheets

TEST EXECUTION OPTIMIZER FOR TEST AUTOMATION

TECHNICAL FIELD

The disclosure generally relates to testing applications, and more specifically to optimizing regression testing of analytics applications.

BACKGROUND

Automation tools perform thousands and thousands of tests on applications before the applications are rolled out into a real-world and utilized by other applications, servers, client devices and/or users. When testing analytics applications, automation tools use different data sources, such as database tables, static and dynamic files, live data feeds, etc., that are injected with data. The data may have particular values that trigger functionality being tested in the analytics application. The automation tools then validate the output data from the tests against the benchmark data that includes the expected results.

The thousands of tests that test an application are stored in a test automation suite. As the application evolves and develops, more features and services are added to the application. To test the new features and services, new tests are created and integrated into the test automation suite. This causes the size of the test automation suite to grow and include more and more tests.

Typically, before the application is rolled out into a real-world, automation tools perform regression testing on the application. During regression testing, most or all tests in the test automation suite are executed against the application, and the output data is validated against the expected test results. Because there are thousands of tests in the test automation suite, regression testing is a time consuming process which may take several hours. Further, when one or more tests during the regression testing fail, the errors in the application are fixed. After the fix, the automation tools re-execute regression tests in the test automation suite against the application to ensure application stability. This process may be performed multiple times until the application passes most or all tests in the test automation suite.

Regression testing takes several hours for numerous reasons. First, there may be thousands of tests in the test automation suite that are executed against the application. Second, these tests are performed sequentially which causes the total execution time to be the sum of the execution times of all executed tests. Tests are performed sequentially because multiple tests may depend on data from the same data sources, and parallel execution of these tests may cause the tests to overwrite data in the one or more data sources. This in turn, may cause subsequent tests to fail because the application may execute subsequent tests using data in the data sources that has been overwritten by other tests.

An alternative approach to reduce time required for regression testing is to create multiple copies of the testing environment. In this way, tests that access the same data sources may execute in parallel, but in different testing environments and not overwrite data stored in the data sources. But this solution is also expensive. First, the testing environment administrator needs to configure and maintain multiple testing environments. Second, the multiple testing environments require additional computing hardware and software to function and conduct the tests. Moreover, this solution may not be scalable as the test automation suite grows, and more and more tests are added into the test automation suite.

Figure 1:
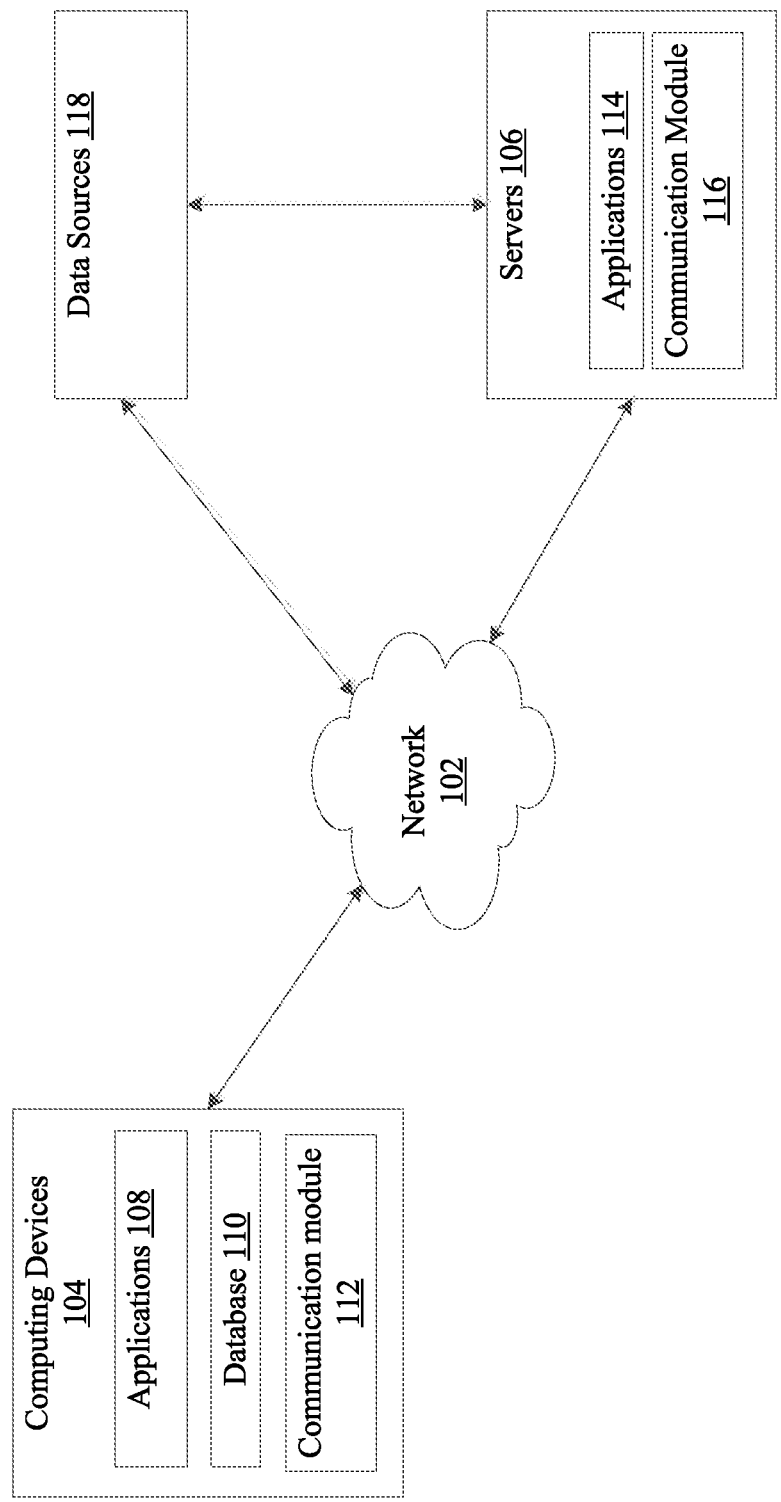
FIG. 1 is a block diagram of a system environment where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The disclosure provides systems, methods, and computer program products that determine regression tests that may be executed in parallel when testing an analytics application and thus reduce time for testing the application. The tests that test the application are stored in a test automation suite. As the application evolves, additional tests are incorporated into the test automation suite, and the test automation suite grows to include thousands of tests. During regression testing, the application needs to execute and validate most or all tests in the test automation suite before the application is released into a real-world environment. Further, regression testing may be performed multiple times when one or more tests fail. In this case, the function or service that caused the application to fail is fixed, and the regression testing is performed from the beginning. This process may be repeated until the application no longer fails one or more tests.

Each test in the test automation suite tests a particular function, service, etc., of the application, causes the application to process data, and compares the output of the function, service, etc., against benchmark data. The tests cause the application to receive and process data from multiple data sources. When multiple tests request the same data from the same data source, one of these tests may inadvertently fail not because of an error in the application, but because another test had already modified the value of the data and caused the application to behave in an unexpected way.

To prevent the inadvertent failure of the test, the testing environment that regression tests the application executes some of the tests in parallel and other tests in sequence. To determine the tests that can be executed in parallel, the data sources that are associated with each test are identified. The data sources may be identified by examining syntax of each test and identifying regular expressions or annotations in the test. The tests that have common data sources are aggregated into temporary groups.

From the temporary groups, test groups are generated. Each test group includes tests from one or more temporary groups, such that data sources that are associated with the tests in each test group do not overlap with other test groups. In this way, the data sources used by tests in each test group are mutually exclusive from the data sources used by the tests in the other test groups.

Once the test groups are generated, a test group automation suite is created for each test group. The testing environment then optimizes regression testing by executing tests in the test group automation suite in parallel with tests from other test group automation suites. The test within the test group automation suite may be executed sequentially. As a result, tests that are associated with different data sources can be executed in parallel within the testing environment. This reduces the amount of time that is required to regression test an application, and avoids the expense of having multiple testing environments.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network or the Internet, accessible by the various components of system 100.

Various components that are accessible to network 102 may be computing devices 104 and servers 106. Computing devices 104 may be portable and non-portable electronic devices under a control of a user and configured to transmit, receive, and manipulate data from servers 106 over network 102. Example computing devices 104 include desktop computers, laptop computers, tablets, smartphones, wearable computing devices, eyeglasses that incorporate computing devices, implantable computing devices, etc.

Computing devices 104 may include one or more applications 108. Applications 108 may be pre-installed on the computing devices 104, installed on the computing devices 104 using portable memory storage devices, such as a compact disk or a thumb-drive, or be downloaded to the computing devices 104 from one or more servers 106. Applications 108 may be executed on the computing devices 104 and receive instructions and data from a user, from server 106, and communicate data to server 106.

Example applications 108 installed on computing devices 104 may be analytics applications. Analytics applications perform business logic, provide services, and measure and improve performance of services and functions of other applications that execute on computing devices 104 based on current and historical data. In an embodiment, applications 108 may also be included as components of various services applications that are configured to transfer money world-wide, receive payments for goods and services, manage money spending, etc., which may be under an ownership or control of a payment service provider, such as PAYPAL®, Inc. of San Jose, Calif., USA, a telephonic service provider, a social networking service provider, and/or other service providers. In another embodiment, applications 108 may also be included as components of security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102. In yet another embodiment, applications 108 may be included in financial applications, such as banking, online payments, money transfer, or other applications, location detection applications, such as a mapping, compass, and/or global positioning system (GPS) application. Further, applications 108 may be included in social networking applications and/or merchant applications device interfaces and other display modules that may receive input and/or output information, software programs, executable by a processor, including a graphical user interface (GUI) configured to provide an interface to the user, etc.

Computing devices 104 may further include a database 110 stored in a transitory and/or non-transitory memory of computing devices 104. The database 110 may store data and be utilized during execution of various modules of computing devices 104. Database 110 may also serve as a data source (described below) that provides data to applications 108. Example data stored in database 110 may include data that is provided, processed and manipulated by applications 108, and may include IDs such as data source IDs, IDs associated with hardware of computing devices 104, or other appropriate IDs, such as IDs used for payment/user/device authentication or identification.

Computing devices 104 may also include at least one communication module 112 adapted to communicate with server 106 over network 102. In various embodiments, communication module 112 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

As described above, server 106 is also connected to network 102. Server 106 may be an application executing on a computing device that provides services and data to applications 108 that execute on computing devices 104. Server 106 may also be maintained by a service provider, such as PAYPAL, a telephonic service provider, social networking service, and/or other service providers. Server 106 may be a cloud server, storage server, web server, or another type of server that is accessible over network 102, and that can receive, transmit, process, aggregate, etc., data on behalf of multiple computing devices 104.

In an embodiment, server 106 also stores and executes applications 114. Applications 114 may be counterparts to applications 108 executing on computing devices 104 and may receive, process, and transmit data to applications 108. Thus, applications 114 may also be analytics applications that are incorporated into services application configured to transfer money world-wide, receive payments for goods and services, manage money spending, etc. In an embodiment, applications 114 may also be incorporated into security applications configured to implement client-side security features, programmatic client applications for interfacing with appropriate application programming interfaces (APIs) over network 102. In another embodiment, applications 114 may also be incorporated into communication applications that use analytics to perform email, texting, voice, and instant messaging functions that allow a user to send and receive emails, calls, texts, and other notifications through network 102. In yet another embodiment, applications 114 may be incorporated into financial applications, such as banking, online payments, money transfer, or other applications. In yet another embodiment, applications 114 may be incorporated into location detection applications, such as a mapping, compass, and/or GPS applications. In yet another embodiment, applications 114 may also be incorporated into social networking applications and/or merchant applications.

In an embodiment, server 106 also includes a communication module 116. Communication module 116 is adapted to communicate with network 102, and transmit data to communication device 104. For example, communication module 116 may be adapted to transmit and receive data from applications 114 to applications 108, and vice versa.

In an embodiment, system 100 includes one or more data sources 118. Data sources 118 store and/or broadcast data over network 102 or directly to server 106. Data sources 118 may be under control of server 106, or be third-party data sources that transmit data or make data accessible to applications 114 that execute on server 106. Example data sources 118 may include databases, data feeds, file storage systems, static and dynamic files, memory caches, etc. Additionally, data sources 118 may also be incorporated into computing devices 104, such as database 110, and may store a subset of data on computing devices 104 that is also available to servers 106.

In an embodiment, prior to applications 108 and/or applications 114, or components, sub-components, or new versions thereof being installed on computing devices 104 and/or servers 106, applications 108 and/or applications 114 are installed and tested in a testing environment. A testing environment may include computing devices 104, servers 106, data sources 118 or any combination, sub-combination, or emulators, thereof. Further, the testing environment may be connected to network 102, or be a standalone environment. Also data in the testing environment may be injected or preloaded into data sources 118, so that the data can activate and validate specific services or functions of applications 108 and/or applications 114.

Figure 2:
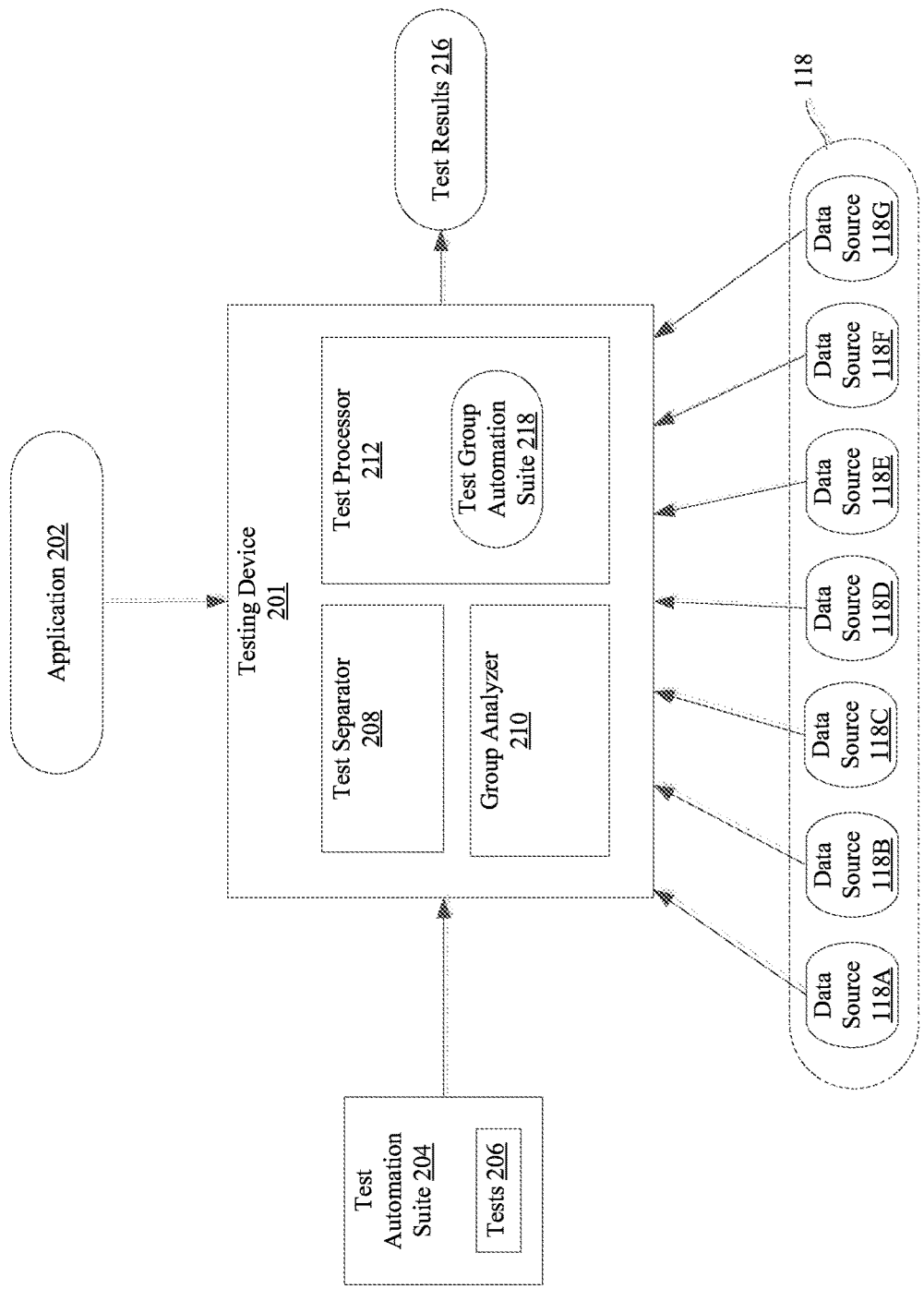
FIG. 2 is a block diagram of a testing environment, according to an embodiment.

FIG. 2 is a block diagram of a testing environment 200, according to an embodiment. As described above, testing environment 200 may be implemented using one or more devices described in FIG. 1, which are collectively referred to as a testing device 201. Testing device 201 may also include some or all components described in detail in FIG. 7.

In an embodiment, testing environment 200 tests an exemplary application 202. Application 202 may be a test version of one of applications 108, 114, or a combination thereof, before the application is released into system 100. In an embodiment, application 202 may be an analytics application. As described above, analytics applications may be data value dependent applications, such that specific values of data may activate certain functions and services in application 202.

In an embodiment, application 202 may be loaded into memory of testing device 201. Once loaded, application 202 may be executed and tested on testing device 201, before application 202 is released into system 100.

To test application 202, testing environment 200 includes a test automation suite 204. The test automation suite 204 may be stored in a memory storage, such as one of memory storages described in detail in FIG. 7. Further, the memory storage may be included in or communicatively coupled to the testing device 201. In an embodiment, test automation suite 204 includes hundreds or thousands of tests 206 that may be conducted on application 202. One or more tests 206 may have different test cases that test a particular portion, code, service, function, module, etc., of application 202 and ensure that application 202 behaves as expected when loaded and executed by users, computing devices 104, servers 106, etc. Example tests 206 may cause application 202 to receive data from one or more data sources 118. The data and/or value of the data may trigger different services, functions, etc., in the application 202 that process the data. Tests 206 then parse and validate the data output generated by the different services, functions, etc., of application 202 and compare the data output against benchmark or expected data. Validation of the data output may identify faults, errors, defects, etc., in application 202 that may be rectified before application 202 is installed in system 100. In an embodiment, testing device 201 executes and validates most, all, or a percentage of tests 206 in test automation suite 202 against application 202 before application 202 may be installed in system 100.

As discussed above, tests 206 may test how application 202 receives and processes data, such as data from one or more data source(s) 118. Example data sources 118 shown in FIG. 2 are data sources 118A-G, and may include data stored in database systems, files systems, static files, dynamic files, memory caches, etc. Also, the services and functions of application 202 that are activated during the one or more tests 206 may depend on a value of data, type of data, etc. Because, tests 206 may depend on the value and type of data from data sources 118A-G, testing device 201 may also be configured to receive data from data sources 118A-G, inject data required for tests 206 into data sources 118A-G, or emulate data that is received from one or more data sources 118A-G, such that the data triggers services and functions that are tested by tests 206. Further, because one or more tests 206 depend on the value of data, testing device 201 may conduct tests 206 that receive data from the same data source 118, such as data source 118A in a specified order. The order ensures that the value of the data remains the same or is modified in a specified order when multiple tests 206 cause application 202 to read and write data from data source 118A. In this way, tests 206 may not fail when application 202 works as expected, even though the tests were conducted out of order.

In an embodiment, to optimize tests 206 conducted on application 202, testing device 201 includes a test separator 208 and a group analyzer 210. Test separator 208 and group analyzer 210 may be hardware or software modules, or combinations thereof, that optimize the amount of time testing device 201 executes tests 206 from the test automation suite 204 on application 206. To optimize the amount of time application 202 runs tests 206, test separator 208 and group optimizer 210 separate tests 206 into test groups according to data sources 118A-G that are used in each test 206. In an embodiment, a subset of tests 206 in each test group receives data from a non-overlapping subset of data sources 118A-G that are specific to the test group. In this way, tests 206 are separated so that tests 206 from different test groups do not modify data from the same data source, and do not overwrite the values of the data which may cause one or more tests 206 to unintentionally fail.

In an embodiment, test separator 208 separates tests 206 into temporary groups according to data sources 118A-G. One way to separate tests 206 into temporary groups is to identify data sources 118A-G that are associated with each test in tests 206. Test separator 208 then aggregates tests 206 that are associated with the same one or more data sources 118A-G into a temporary group. To identify data sources 118A-G associated with each test in tests 206, test separator 208 may parse the syntax of tests 206 and identify regular expressions or annotations in each test 206 that are associated with or identify a particular data source 118. In another example, test separator 208 may also identify function calls that request data from one or more data sources 118. In yet another example, test separator 208 may parse the configuration file associated with tests 206 and use the configuration file to identify data sources 118 used by each test. Further, a person of ordinary skill in the art will appreciate that the above examples that identify data sources 118 associated with each test are not limiting and that test separator 208 may use other methodologies to identify data sources 118 that are associated with each test.

Figure 3:
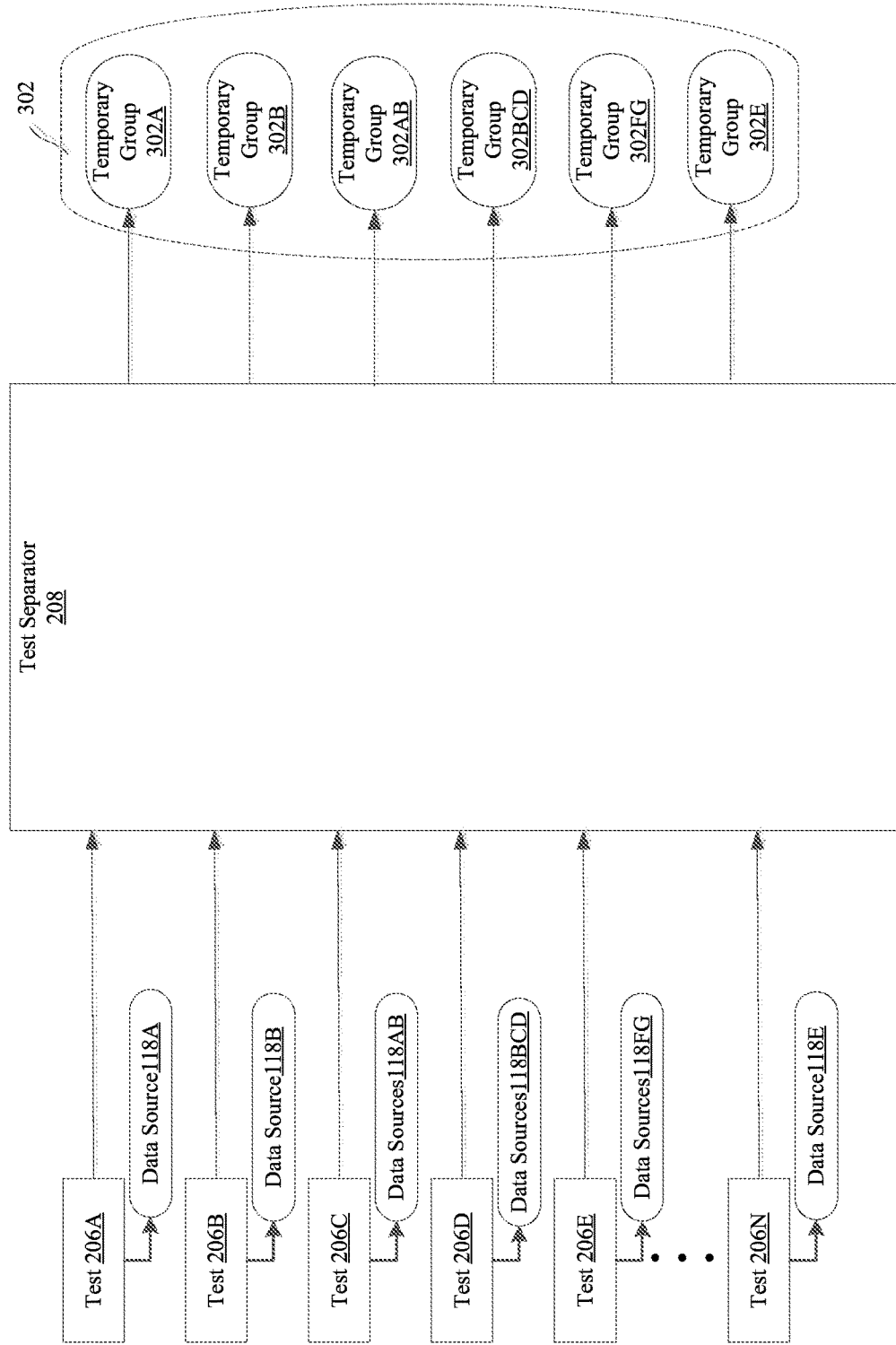
FIG. 3 is a block diagram of a test separator, according to an embodiment.

FIG. 3 is a block diagram 300 of a test separator 208, according to an embodiment. As discussed with reference to FIG. 2, test separator 208 separates tests 206 into temporary groups. As illustrated in FIG. 3, test separator 208 receives exemplary tests 206A-N and separates tests 206A-N into six exemplary temporary groups, such as temporary groups 302A, 302B, 302AB, 302BCD, 302FG, and 302E. To generate temporary groups 302A, 302B, 302AB, 302BCD, 302FG, and 302E, test separator 208 parses tests 206A-N and determines that data source 118A is associated with test 206A, and places test 206A into temporary group 302A. Test separator 208 also determines that data source 118B is associated with test 206B and places test 206B into temporary group 302B. Next, test separator 208 determines that data sources 118A and 118B are associated with test 206C, and place test 206C into temporary group 302AB. Test separator 208 also parses test 206D and determines that data sources 118B, 118C, and 118D are associated with test 206D. Test separator 208 then places test 206D into temporary group 302BCD. Next, test separator 208 parses test 206E and determines that data sources 118F and 118G are associated with test 206E, and places test 206E into temporary group 302FG. Additionally, test separator 208 parses test N and determines that data source 118E is associated with test 206N. Test separator 208 then places test 206N into temporary group 302E.

Going back to FIG. 2, once test separator 208 determines temporary groups 302, group analyzer 210 generates test groups from temporary groups 210. In an embodiment, group analyzer 210 aggregates one or more temporary groups 302 into a test group such that each test group includes tests 206 that utilize data from non-overlapping data sources 118. In other words, temporary groups 302 that include tests 206 that access the same data sources 118 are aggregated into a single test group. In this way, testing device 201 can execute different test groups in parallel without risking that tests 206 in different test groups may cause application 202 to overwrite data in one or more data sources 118.

Figure 4:
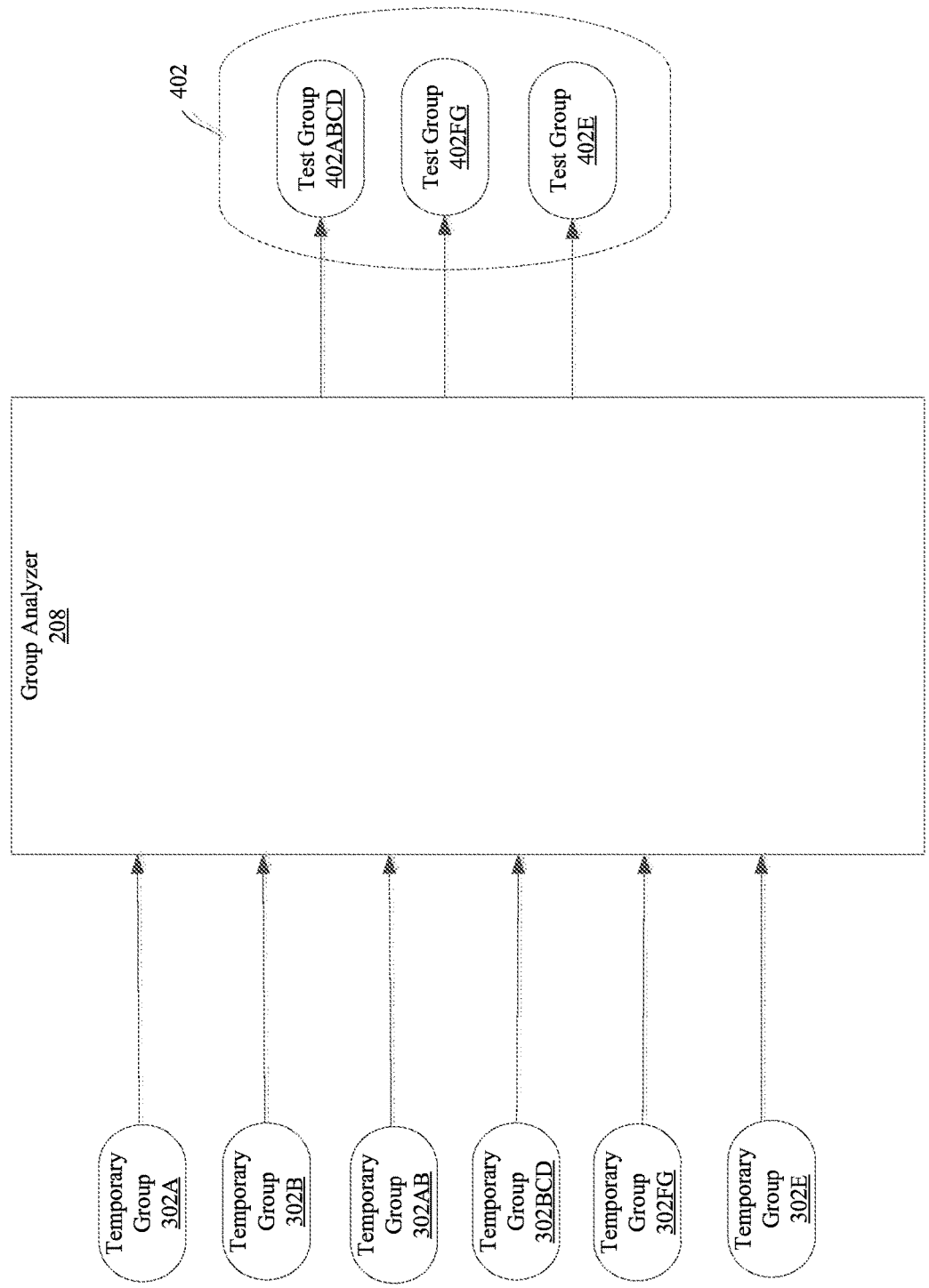
FIG. 4 is a block diagram of a group analyzer, according to an embodiment.

FIG. 4 is a block diagram 400 of a group analyzer 210, according to an embodiment. As described above, group analyzer 210 aggregates temporary groups 302 into test groups. As illustrated in FIG. 4, group analyzer 210 receives temporary groups 302A, 302B, 302AB, 302BCD, 302FG, and 302E that were generated by test separator 208 in FIG. 3. Group analyzer 210 then generates test groups 402, such as 402ABCD, 402FG, and 402G from the temporary groups 302A, 302B, 302AB, 302BCD, 302FG, and 302E.

In an embodiment, group analyzer 210 generates test groups 402 such that each one of data sources 118A-G is associated with a single test group 402. Further, group analyzer 210 aggregates temporary groups 302 that include tests 206 that are associated with overlapping data sources 118 into a single test group 402. For example, group analyzer 210 aggregates temporary groups 302A, 302B, and 302AB into a single test group ABCD because temporary group 302AB includes test 206C that is associated with data sources 118A and 118B. Group analyzer 210 also adds temporary group 302BCD into test group ABCD because test 206D in temporary group 302BCD utilizes data from data source 118B.

In an embodiment, group analyzer 210 also generates test group 402FG from temporary group 302FG. As illustrated in FIG. 4, the group analyzer 210 does not add additional temporary groups 302 into test group 402G because the other temporary groups 302 do not include tests 206 that are associated with either data source 118F or data source 118G. Similarly, group analyzer 210 generates test group 402E from temporary group 302E, and does not add additional temporary groups 302 into test group 402E because other tests 206 are not associated with data source 118E.

Going back to FIG. 2, in an embodiment, once group analyzer 210 generates the test groups 402, group analyzer 210 may also generate test group automation suites 218. In an embodiment, there may be one test group automation suite 218 per test group 402. The test group automation suite 218 may then include tests 206 that are included in the test group 402. For example, tests 206A, 206B, 206C, and 206D from test group 402ABCD illustrated in FIG. 4 may be included in a single test group automation suite 218. In another embodiment, there may be multiple test groups 402 in a single test group automation suite 218 as long as the test groups in the test group automation suite 218 do not read and write data from the same data sources 118. For example, tests 206E and 206N from test groups 402FG and 402E illustrated in FIG. 4 may be included in a single test group automation suite 218.

In an embodiment, testing environment 200 also includes a test processor 212. Test processor 212 may be included in or coupled to testing device 101. Test processor 212 may also execute tests 206 in the test automation suite 204 on application 202 and generate test results 216. The test results 216 may include output data from multiple tests 206 that test processor 212 has compared and verified against the expected results or benchmark data. In a further embodiment, test processor 212 may optimize the execution of tests 206 by executing tests 206 in test group automation suites 218 in parallel with each other. Such parallel execution may be possible because tests 206 in different test group automation suites 218 may execute independently of each other as these tests 206 utilize data from different data sources 118. In this way, tests 206 in different test group automation suites 218 do not overwrite data in the same data source 118, which may cause tests 206 to fail due to corrupted data and not errors in application 202.

Figure 5:
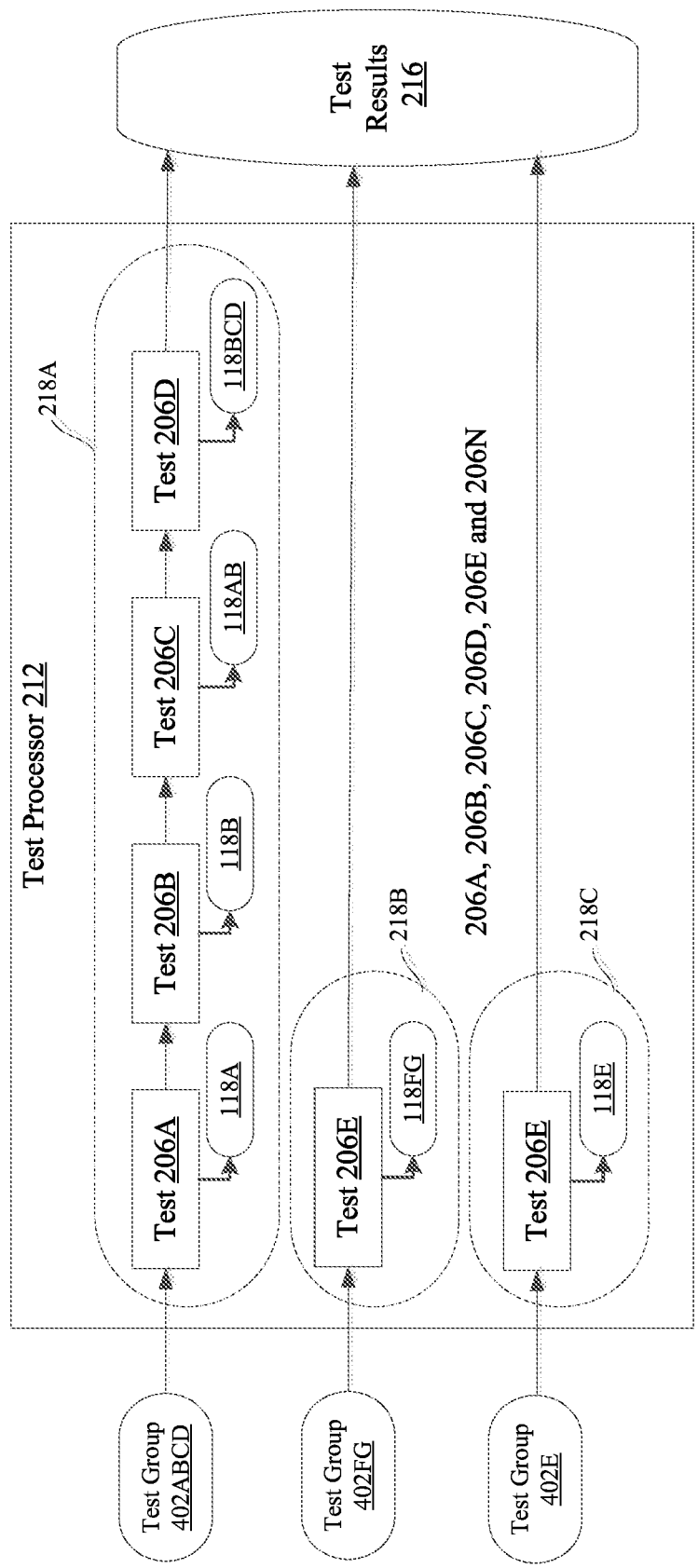
FIG. 5 is a block diagram of a test processor performing parallel execution of test groups, according to an embodiment.

FIG. 5 is a block diagram 500 of a test processor executing test group automation suites in parallel, according to an embodiment. As illustrated in FIG. 5, test processor 212 executes test group automation suites 218, such as test group automation suites 218A-C, in parallel with each other. Test group automation suites 218A-C include test groups 402, such that test group automation suite 218A includes test group 402ABCD, test group automation suite 218B includes test group 402FG, and test group automation suite 218C includes test group 402E. As discussed above, test group 402ABCD includes tests 206A, 206B, 206C, and 206D, test group 402FG includes test 206E, and test group 402E includes test 206N.

In an embodiment, test processor 212 executes tests 206A-N in test groups 402ABCD, 402FG, and 402E in parallel with each other. In this case, test processor 212 executes tests 206A, 206B, 206C, and 206D from test group 402ABCD sequentially because tests 206A, 206B, 206C, and 206D receive and process data from common data sources 118A-D. However, test processor 212 executes test 206E that receives and processes data from data sources 118F and 118G in parallel with tests 206A, 206B, 206C, and 206D. Similarly, test processor 212 executes test 206N that receives and processes data from data source 118E in parallel with tests 206A, 206B, 206C, 206D, and 206E.

In an embodiment, because test group automation suites 218A-C execute in parallel, test processor 212 may determine the maximum execution time for tests 206A-N as the maximum execution time of tests in test group 402ABCD, tests in test group 402FG or tests in test group 402E. In other words, the maximum execution time of tests 206A-N is the execution time of the longest executing test group.

In a further embodiment, as tests 206A, 206B, 206C, 206D, 206E and 206N execute, test processor 212 generates test results 216. Test results 216 include tests results of each one of tests 206A, 206B, 206C, 206D, 206E and 206N, which may include data output from the tests as compared against expected results or benchmark data. Further, if test results 216 indicate that one or more of tests 206A, 206B, 206C, 206D, 206E or 206N fail, test processor 212 may re-execute tests 206A, 206B, 206C, 206D, 206E and 206N in parallel according to test groups 402ABCD, 402FG, and 402E.

Figure 6:
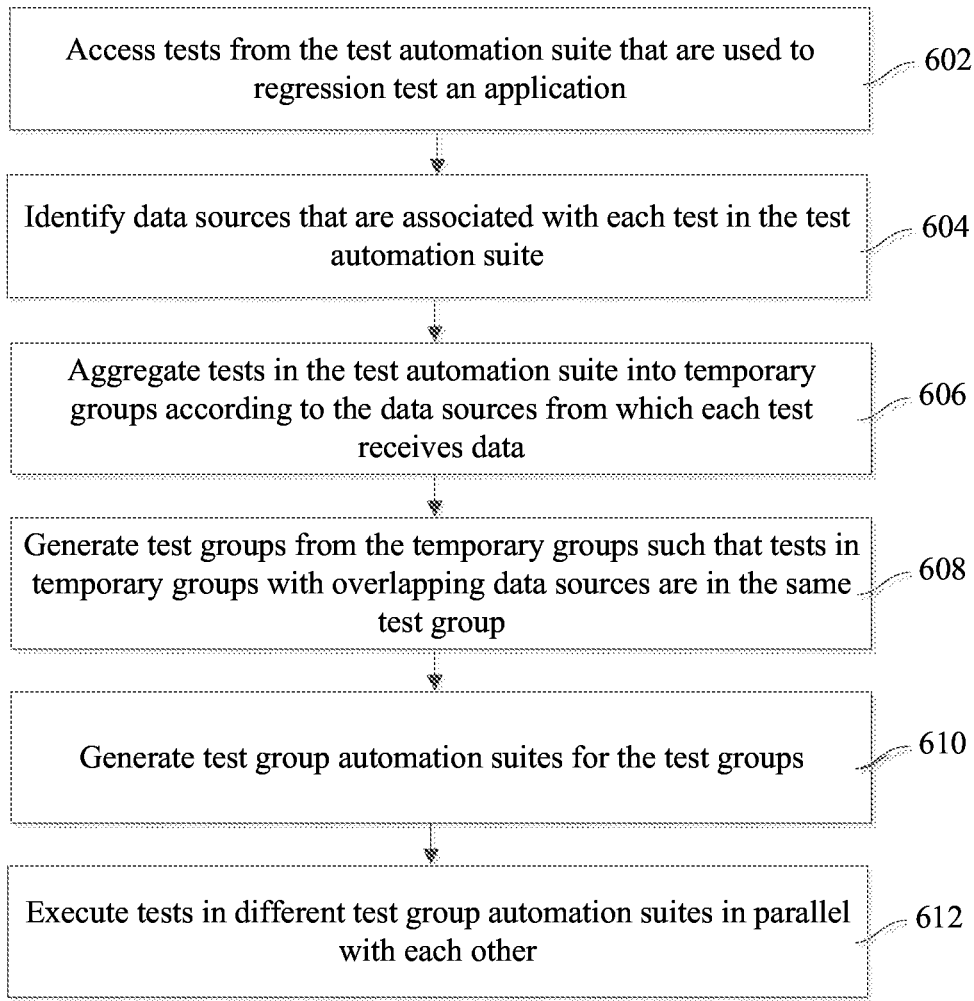
FIG. 6 is a flowchart of a method for generating tests that can execute in parallel, according to an embodiment.

FIG. 6 is a flowchart of a method 600 for determining tests that can execute in parallel, according to an embodiment. Method 600 may be performed using hardware and/or software components described in FIGS. 1-5. Note that one or more of the operations may be deleted, combined, or performed in a different order as appropriate. Further, additional operations may be performed at various stages of the method.

At operation 602, tests in the test automation suite are accessed. For example, testing device 201 accesses tests 206 in the test automation suite 204 that are used in regression testing of application 202. As described above, application 202 may be an analytics application that may be tested with value dependent data, and each test 206 may cause a service, function, etc., of application 202 to receive, process, and modify data stored in data sources 118. As also described above, tests 206 in the test automation suite 204 may be stored within testing device 201 or be stored in another memory storage that is coupled to the testing device 201.

At operation 604, data sources for each test are identified. For example, for each test in tests 206, test separator 208 identifies data sources 118 that are associated with the test. In an embodiment, test separator 208 may examine syntax of each test and identify regular expressions or annotations in the test that indicate that the test uses one or more data sources 118.

At operation 606, tests are aggregated into temporary groups. For example, test separator 208 aggregates tests 206 into temporary groups 302 according to the data sources 118 identified for each test in operation 604. In an embodiment, tests 206 that have the same data sources 118 are aggregated into the same temporary group 302.

At operation 608, test groups are generated. For example, group analyzer 210 generates test groups 402 from the temporary groups 302, such that temporary groups 302 that include tests with overlapping data sources 118 are in the same test group. In this way, each data source 118 may be associated with one or more tests 206 in a single test group of test groups 402.

At operation 610, test group automation suites are generated. For example, group analyzer 210 generates test group automation suites 218. In an embodiment, group analyzer 210 generates a test group automation suite for each test group in test groups 402.

At operation 612, test group automation suites are executed. For example, test processor 212 tests application 202 using tests 206. In an embodiment, test processor 212 executes tests 206 in different test group automation suites 218 in parallel with each other. In this way, tests 206 from different test group automation suites 218 may execute in parallel without modifying data stored in data sources 118 which may cause subsequent tests 206 to fail.

Figure 7:
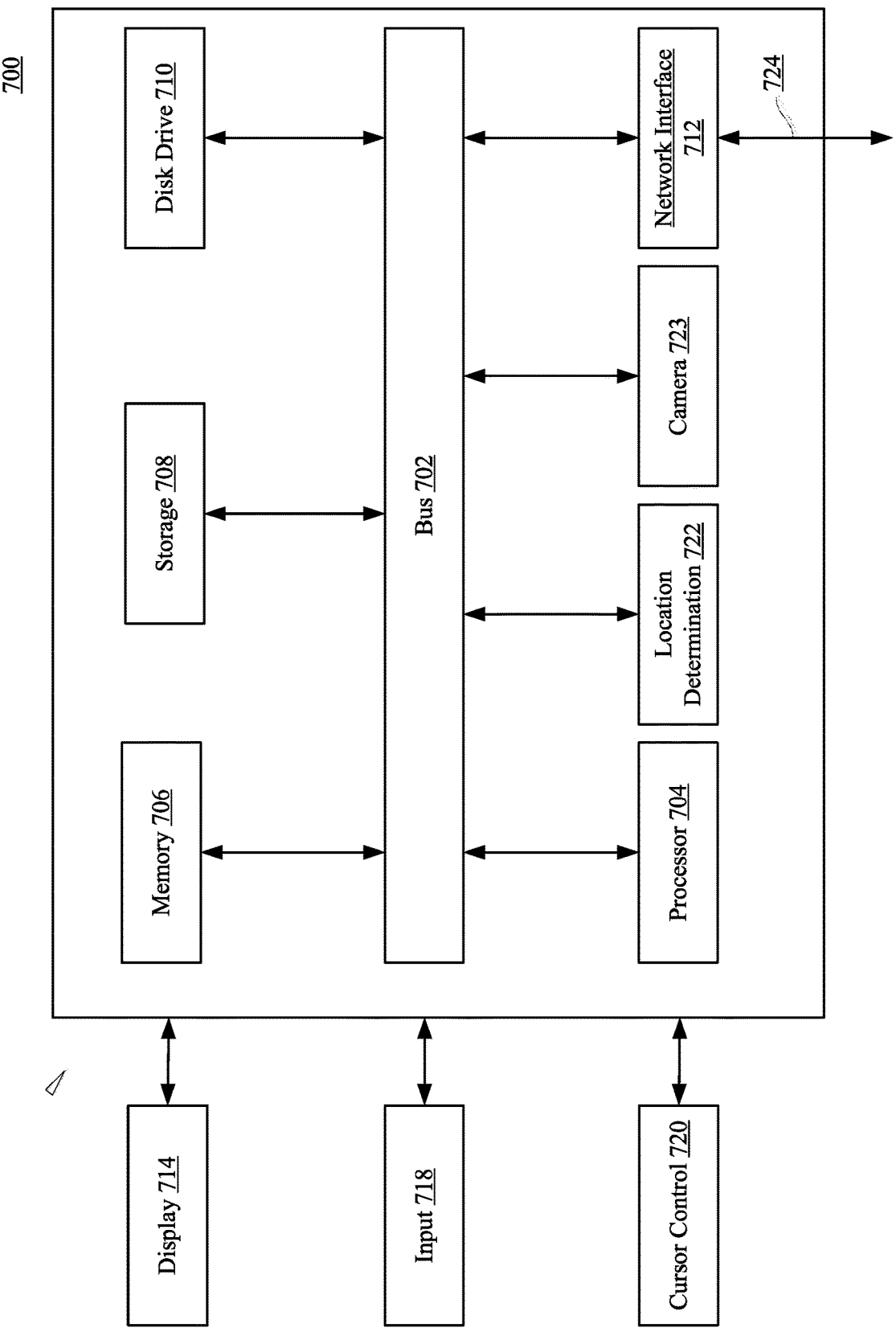
FIG. 7 is a block diagram of a computer system suitable for implementing one or more components in FIGS. 1-5, according to an embodiment.

Referring now to FIG. 7 an embodiment of a computer system 700 suitable for implementing, the systems and methods described in FIGS. 1-6 is illustrated.

In accordance with various embodiments of the disclosure, computer system 700, such as a computer and/or a server, includes a bus 702 or other communication mechanism for communicating information, which interconnects subsystems and components, such as a processing component 704 (e.g., processor, micro-controller, digital signal processor (DSP), graphics processing unit (GPU), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), a location determination component 722 (e.g., a Global Positioning System (GPS) device as illustrated, a cell tower triangulation device, and/or a variety of other location determination devices known in the art), and/or a camera component 723. In one implementation, the disk drive component 710 may comprise a database having one or more disk drive components.

In accordance with embodiments of the disclosure, the computer system 700 performs specific operations by the processor 704 executing one or more sequences of instructions contained in the memory component 706, such as described herein with respect to the mobile communications devices, mobile devices, and/or servers. Such instructions may be read into the system memory component 706 from another computer readable medium, such as the static storage component 708 or the disk drive component 710. In other embodiments, hard-wired circuitry may be used in place of or in combination with software instructions to implement the disclosure.

Logic may be encoded in a computer readable medium, which may refer to any medium that participates in providing instructions to the processor 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 700. In various other embodiments of the disclosure, a plurality of the computer systems 700 coupled by a communication link 724 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
a non-transitory memory storing instructions; and
one or more hardware processors coupled to the non-transitory memory and configured to read the instructions from the non-transitory memory to cause the system to perform operations comprising:
accessing a plurality of tests in a test automation suite, wherein the plurality of tests test one or more functions of an application;
for each test in the plurality of tests, identifying at least one data source that is associated with each test;
aggregating one or more tests in the plurality of tests into temporary groups according to the at least one data source, wherein to aggregate the one or more tests the one or more processors cause the system to perform operations comprising:
aggregating into a first temporary group of the temporary groups a first test of the plurality of tests, wherein the first test is associated with a first data source in the at least one data source; and
aggregating into a second temporary group of the temporary groups a second test of the plurality of tests, wherein the second test is associated with the first data source and a second data source in the at least one data source;
generating test groups from the temporary groups, wherein each test group comprises one or more tests associated with non-overlapping data sources, and wherein a test group in the test groups includes the first temporary group and the second temporary group; and
performing parallel execution of the test groups on the application.

2. The system of claim 1, wherein the application is an analytics application.

3. The system of claim 2, wherein the operations further comprise:
generating a test group automation suite for the test group from the test groups.

4. The system of claim 1, wherein the operations further comprise:
determining a maximum execution time of the test groups as a maximum execution time of a longest executing test group.

5. The system of claim 1, wherein tests in a temporary group of the temporary groups share data from the at least one data source.

6. The system of claim 1, wherein the operations further comprise:
performing sequential execution of tests within the test group of the test groups.

7. The system of claim 1, wherein the first test in the plurality of tests activates a service in the application that modifies data in the at least one data source.

8. The system of claim 7, wherein a value of the data determines behavior of the service in the application.

9. A method comprising:
for each test in a plurality of tests stored in a test automation suite of a computing device configured with a testing environment, identifying at least one data source that is associated with each test;
aggregating one or more tests in the plurality of tests into temporary groups according to the at least one data source associated with the tests, wherein the aggregating further comprises:

aggregating into a first temporary group of the temporary groups a first test of the plurality of tests, wherein the first test is associated with a first data source; and aggregating into a second temporary group of the temporary groups a second test of the plurality of tests, wherein the second test is associated with the first data source and a second data source;

generating test groups from the temporary groups, wherein each test group comprises one or more tests associated with non-overlapping data sources, and wherein a test group includes the first temporary group and the second temporary group; and performing parallel execution of the test groups on an analytics application.

10. The method of claim 9, further comprising:
generating a test group automation suite for the test group from the test groups.

11. The method of claim 9, further comprising:
determining a maximum execution time of the test groups as a maximum execution time of a longest executing test group.

12. The method of claim 9, wherein the first test and a third test in the first temporary group of the temporary groups share data from the at least one data source.

13. A system, comprising:
a non-transitory memory storing instructions; and
one or more hardware processors coupled to the non-transitory memory and configured to read the instructions from the non-transitory memory to cause the system to perform operations comprising:
for each test in a plurality of tests in a test automation suite, identifying at least one data source that is associated with each test;
aggregating tests in the plurality of tests into a plurality of temporary groups according to the at least one data source, wherein the one or more processors further cause the system to perform operations comprising:

aggregating into a first temporary group of the temporary groups a first test of the plurality of tests, wherein the first test is associated with a first data source; and aggregating into a second temporary group of the temporary groups a second test of the plurality of tests, wherein the second test is associated with the first data source and a second data source; and generating test groups from the temporary groups, wherein each test group comprises tests associated with non-overlapping data sources and wherein a test group in the test groups includes the first temporary group and the second temporary group; and performing parallel execution of the test groups on an analytics application, wherein the test groups test at least one function of the analytics application.

14. The system of claim 13, wherein the operations further comprise:
generating a first test group automation suite for the first test group from the test groups;
generating a second test group automation suite for the second test group from the test groups; and
executing the first test group automation suite in parallel with the second test group automation suite.

15. The system of claim 13, wherein the first test and a third test in the first temporary group of the plurality of temporary groups share data from the at least one data source.

16. The method of claim 9, wherein the aggregating further comprises:
aggregating a third test in the one or more tests with the second test in the second temporary group of the plurality of temporary groups.

17. The method of claim 9, wherein identifying the data source further comprises:
identifying a function call for each test, wherein the function call requests data from the at least one data source.

* * * * *